United States Patent
Chapman et al.

(10) Patent No.: US 9,519,710 B1
(45) Date of Patent: Dec. 13, 2016

(54) DYNAMIC CLASSIFICATION OF ATTRIBUTE RELEVANCE AND CLASSIFICATION

(71) Applicant: IMDb.com, Inc., Seattle, WA (US)

(72) Inventors: Murray Leigh Chapman, Carnation, WA (US); Keith Nolan Simanton, Edmonds, WA (US)

(73) Assignee: IMDb.com, Inc., Seattle, WA (US)

( * ) Notice: Subject to any disclaimer, the term of this patent is extended or adjusted under 35 U.S.C. 154(b) by 176 days.

(21) Appl. No.: 14/213,798

(22) Filed: Mar. 14, 2014

(51) Int. Cl.
*G06F 17/30* (2006.01)

(52) U.S. Cl.
CPC ............................ *G06F 17/3082* (2013.01)

(58) Field of Classification Search
CPC ........... G06F 17/3082; G06F 17/30784; G06F 17/30817; G06F 17/30828
USPC .................... 707/723, 733, 748, 752
See application file for complete search history.

(56) References Cited

U.S. PATENT DOCUMENTS

| | | | | |
|---|---|---|---|---|
| 8,843,839 B1 * | 9/2014 | Salyers | ................. | G06Q 50/01 715/751 |
| 2006/0242139 A1 * | 10/2006 | Butterfield | ........ | G06F 17/30265 707/999.005 |
| 2009/0100455 A1 * | 4/2009 | Frikker | ............. | G06F 17/30032 725/13 |
| 2009/0240692 A1 * | 9/2009 | Barton | ................ | G06F 17/3082 707/999.005 |
| 2011/0093329 A1 * | 4/2011 | Bodor | .................... | G06Q 30/02 705/14.42 |
| 2013/0185291 A1 * | 7/2013 | Tyndall | ............. | G06F 17/30867 707/723 |
| 2015/0100987 A1 * | 4/2015 | Whitman | ........... | G06Q 30/0282 725/53 |

* cited by examiner

*Primary Examiner* — Hares Jami

(74) *Attorney, Agent, or Firm* — Kilpatrick Townsend & Stockton LLP

(57) ABSTRACT

Systems and methods for classifying and ranking one or more keywords associated with a media work may be provided. In an embodiment, a system can recommend a set of media works in response to receiving information about a keyword associated with a media work. The system can recommend the set of media works based on aggregated classification information for a plurality of keywords associated with a plurality of media works, and aggregated rating information for the aggregated classification information. In an example, the aggregated rating information can represent the relevancy of a classification associated with at least one media work of the plurality of media works.

22 Claims, 11 Drawing Sheets

Web Browser → 402

FILE  EDIT  VIEW  FAVORITES  TOOLS  HELP

Address: [ The Greatest Movie Ever (2000) ] ← 406    [     ] ▷ GO ← 408

Keywords:

| Rank | Keyword | Class | Rating |
|---|---|---|---|
| 476. | slow-motion-scene | meta ▶ | 1  2  3  4  5  6  7  8  9  10 |
| 2187. | reality | plot_element ▶ | 1  2  3  4  5  6  7  8  9  10 |
| 2727. | virtual-reality | plot_element ▶ | 1  2  3  4  5  6  7  8  9  10 |
| 2857. | alternative-reality | plot_element ▶ | 1  2  3  4  5  6  7  8  9  10 |
| 25248. | matrix | plot_element ▶ | 1  2  3  4  5  6  7  8  9  10 |
| 2930. | artificial-intelligence | plot_element ▶ | 1  2  3  4  5  6  7  8  9  10 |
| 8866. | parallel-world | plot_element ▶ | 1  2  3  4  5  6  7  8  9  10 |
| 328. | computer | plot_element ▶ | 1  2  3  4  5  6  7  8  9  10 |
| 10255. | man-versus-machine | theme ▶ | 1  2  3  4  5  6  7  8  9  10 |
| 272. | showdown | theme ▶ | 1  2  3  4  5  6  7  8  9  10 |
| 3054. | cyberpunk | plot_element ▶ | 1  2  3  4  5  6  7  8  9  10 |
| 5061. | hacker | plot_element ▶ | 1  2  3  4  5  6  7  8  9  10 |
| 159. | betrayal | theme ▶ | 1  2  3  4  5  6  7  8  9  10 |
| 392. | blood-spatter | meta ▶ | 1  2  3  4  5  6  7  8  9  10 |
| 7. | murder | plot_element ▶ | 1  2  3  4  5  6  7  8  9  10 |
| 18. | violence | Select... ▶ |  |
| 23. | blood | Select... ▶ |  |
| 59. | explosion | Select... ▶ |  |

FIG. 4

DYNAMIC CLASSIFICATION OF ATTRIBUTE RELEVANCE AND CLASSIFICATION

BACKGROUND

Today's internet users can find a plethora of information online today via internet based information resources such as Wikipedia. Websites similar to Wikipedia for varying subjects are also abundant and can usually be browsed and are accessible via keyword searches. Some internet based information resources rely on user input to help populate and update the informational database associated with the website and relied on by other users. Certain websites utilize human oversight or personal review performed by someone associated with the website to police for correct information entry and enforcement of certain rules, such as rules concerning the entry of profanity laden information. However, this type of data entry and review has inherent flaws. For example, large amounts of data may be entered and un-reviewed, or not enough data may be gathered for certain topics. This can cause either the proliferation of incorrect information due to a large portions of un-reviewed data or cause dissatisfaction and confusion among users attempting to gain knowledge concerning a certain subject that is lacking user input.

BRIEF DESCRIPTION OF THE DRAWINGS

Various embodiments in accordance with the present disclosure will be described with reference to the drawings, in which:

FIG. 4 illustrates an example user interface presented via a web browser for providing a keyword classification and ranking feature as described herein, according to at least one example;

DETAILED DESCRIPTION

Figure 1:
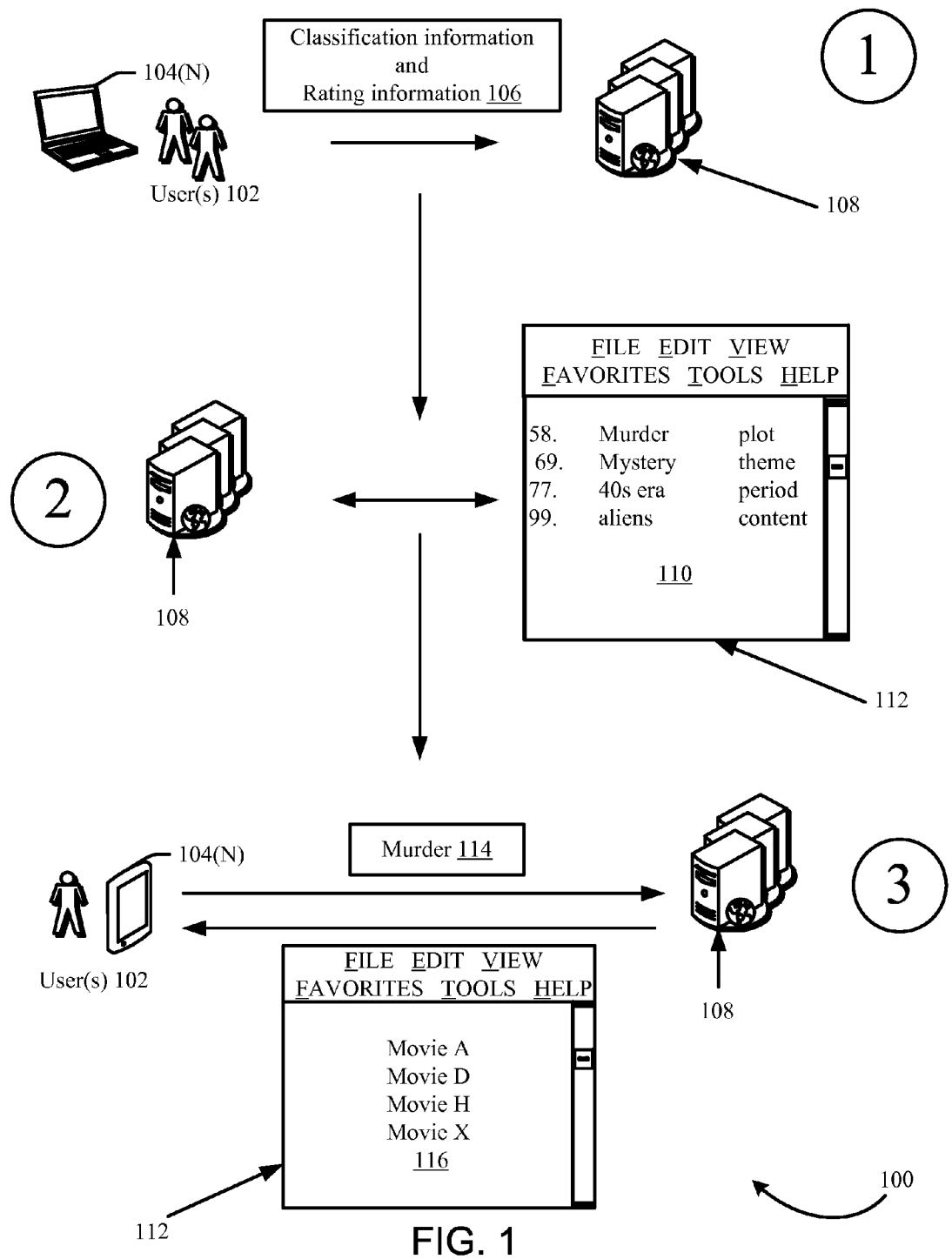
FIG. 1 illustrates an illustrative flow for providing a keyword classification and ranking feature as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for classifying, rating, and ranking keywords associated with a media work. In particular, the system can obtain or receive user input from a plurality of users of an online information resource via a user interface, the user input specifying a classification and a rating for a keyword associated with a media work, ranking one or more keywords associated with the media work based on the user input, and recommending to the user one or more other media works to a user in response to a search or recommendation request. For example, the system may present a user interface to a user of an online information resource requesting input regarding a classification for a keyword associated with a media work. Further, the system may query the user to provide a rating for the classified keyword associated with the media work. The user may be prompted to provide input for a plurality of keywords associated with the media work. In accordance with at least one embodiment, the user may provide the classification and rating for the classification without a request from the service. A service provided by the system may obtain classification and rating information from a plurality of users and aggregate the results to obtain an aggregate rating for the classification of a particular keyword associated with a media work.

In accordance with at least one embodiment, the classification information may include categorizing a keyword into categories associated with a media work including but not limited to a plot, content, theme, audience, mood, location, genre, sub-genre, time, meta, or tone. In accordance with at least one embodiment, the service may utilize the aggregate rating and classification information to rank one or more keywords associated with the media work. The service may continually update the ranking of the one or more keywords associated with the media work based on user input. In accordance with at least one embodiment, the service may provide to the user a set of media works based on a search query or user input. The search query can include the title of a media work with a request for similar media works.

In accordance with at least one embodiment, the search query can include a keyword with a request for media works where the keyword is either more or less prominent according to classification and rating information associated with the keyword. In accordance with at least one embodiment, the service may present to the user a set of media works in response to a recommendation request to users utilizing the online information resource. The recommended set of media works can include media works that share keyword classifications and ratings or have contain keywords with similar rankings. As used herein, the phrase "media work" includes a movie, a TV show, a web series, a video game, or a work of literature. As used herein, the phrase "keyword" includes any alpha-numeric string that represents a keyword and conforms to appropriate English syntax. In accordance with at least one embodiment, a unique identifier may be associated with each media work. The unique identifier may be updated by the service associated with the online information resource. In accordance with at least one embodiment, the service may receive search or recommendation queries based on the unique identifier associated with the media work and perform operations described herein, including classification and rating input/requests, and providing or presenting a set of media works based on the search or recommendation query. In accordance with at least one embodiment, the service may maintain and assign unique identifiers for characters associated with the media works, where keywords may be associated to the characters utilizing the unique identifiers. In accordance with at least one embodiment, the unique identifiers for the characters can be generated and assigned to specific iterations of a character. For example, a unique identifier may exist for two different versions of a literary monster character. As used herein, the phrase "online information resource" includes any appropriate user edited information resource accessible and edited via a user interacting with the information resource utilizing network technology.

In a non-limiting example, the service may receive or obtain classification and rating information about a plurality of keywords associated with a media work. For example, the service may provide to the user a user interface which allows the user to specify classification information for a keyword associated with a film, and rating information representing a relevancy of the classification for the keyword. The user may provide the classification information and rating information for as many or as few keywords associated with the film as the user desires. The service may obtain and aggregate user input as described above from a plurality of users utilizing an online information resource associated with the service. The service may utilize the aggregated classification and rating information to rank the keywords associated with the film. The service may recommend a set of media works to the user in response to a search query from the user via the user interface. For example, the user may enter a query indicating that they enjoyed a blockbuster film about pirates with supernatural plot elements but they would like to see a movie about pirates with less supernatural plot elements. In accordance with at least one embodiment, the service may recommend a set of movies based on an algorithm utilizing ranking information associated with the set of movies and the query from the user.

In accordance with at least one embodiment, the service may receive a search query from a user including a keyword. For example, a user may wish to view media works that contain murder as an important plot element. In response to the user's query, the service may recommend a set of media works that have the keyword murder, classified as a plot element, and the rating for the keyword to the plot element is highly rated. In accordance with at least one embodiment, the service may utilize the aggregated classification and rating information to continually update the ranking of keywords associated with a media work. The service may render certain keywords associated with a movie useless as they will either be ranked so low that they can never appear in response to a query or would remain unrated. In accordance with at least one embodiment, keywords which are not classified and rated by a user represent an important data point captured by the service, as keywords that lack classification or rating information are ranked the lowest for an associated media work. The specifying of a classification and rating for the classification also can service to remove duplicate keywords from a keyword list associated with a media work. Two keywords that are related semantically, such as "female solider" and "woman solider" can be filtered through the data obtained from the plurality of users providing classification and rating information as users will likely indicate that one of the two keywords is more strongly associated with the media work, or will indicate that one keyword is more properly classified as a theme for example while the other keyword may be more properly classified as a plot element.

In accordance with at least one embodiment, the service may organize a plurality of keywords by their classification in a hierarchical tree. For example, keywords that are classified as theme may be grouped together in a particular node of a hierarchical tree, while keywords that are classified as tone may be grouped together in a separate node of a hierarchical tree. In accordance with at least one embodiment, the hierarchical tree can include nodes for each classification and can contain hierarchical levels based on a raw number of keywords included in each category. For example, nodes containing a greater number of keywords may be organized into the root node, with branching nodes corresponding to a lesser number of keywords included in their respective category. In accordance with at least one embodiment, the hierarchical tree organization of the keywords may be updated based on the aggregated user provided classification and rating information.

In accordance with at least one embodiment, the service may be configured to allow users to add new keywords, and provide corresponding classification and rating information. In accordance with at least one embodiment, the newly added keywords may enter a probation period during which the keyword may be reviewed by a person associated with the service. The service may allow users to provide classification and rating information for the newly added keyword after the probation period. As described above, if the keyword is relevant to the media work then it will most likely be classified and rated appropriately. The newly added keyword may after a certain period of time be ranked among the most important or relevant keywords of the media work due to the aggregated classification and rating information. If the keyword is not relevant to the media work, then it will remain unclassified or rated and thus will be placed at the bottom of a ranking list of keywords associated with the media work.

In accordance with at least one embodiment, the service may query users for classification information and rating information for media works. For example, the service may identify that a particular media work lacks classification and rating information for the majority of keywords associated with it. Or the service may identify that two keywords associated with a media work require more data to further distinguish them from each other (referring to the "female soldier" and "woman soldier" scenario above). In accordance with at least one embodiment, the service may weigh classification and rating information from certain users more heavily than other users. For example, the service may implement a user profile feature that includes a peer rating system. Users that are highly rated may have a greater weight applied to their data entries as opposed to users that are unrated or lowly rated. In accordance with at least one embodiment, the service may analyze user provided data entries for factual accuracy and provide a user rating to the user that can affect the weight applied to classification and rating information provided by the user.

FIG. 1 illustrates an illustrative flow for providing a keyword classification and ranking feature as described herein, according to at least one example. All examples described in the present disclosure are non-limiting examples. In one non-limiting example, the method 100 can include a plurality of users 102 interacting with computing devices 104 to provide classification information and rating information 106 for a plurality of keywords associated with a media work to one or more service provider computers 108 associated with the service at step 1. In the current example, the arrow from the users 102 to the one or more service provider computers 108 represents a flow of information. For example, the classification information and rating information 106 may include designations of classifications, and ratings for the classifications, of a plurality of keywords associated with a media work (the keyword murder classified as a plot element with a high rating indicating great relevancy).

The method 100 can include the one or more service provider computers 108 ranking the plurality of keywords 110 associated with a media work for presentation to a user via a web browser 112 at step 2. In the current example, the ranking of the plurality of keywords 110 are for a movie and include the keywords murder, mystery, 40s era, and aliens, with corresponding ranks represented by the numerals 58, 69, 77, and 99, and keyword classifications plot, theme, period, and content, respectively. In accordance with at least one embodiment, the one or more service provider computers 108 may have ranked the keywords 110 based on aggregated classification and ranking information obtained from a plurality of users. The method 100 can include a user 102 utilizing a computing device 104 to request a movie recommendation from the one or more service provider computers 108 based on a provided keyword 114. The one or more service provider computers 108 may provide a set of media works 116 (movies in the current example) to the user 102 via a web browser 112 at step 3.

For example, the user 102 may have requested a movie recommendation from the service based on the keyword "murder" 114. In response, the one or more service provider computer 108 may identify movies that contain the keyword "murder" as a highly ranked keyword. In accordance with at least one embodiment, the one or more service provider computers 108 may recommend a set of movies 116 to the user 102 based on the ranking information of the requested keyword associated with the set of movies 116. In accordance with at least one embodiment, a user may request a recommended set of media works based on more than a keyword. For example, a user may request media works that are similar to the title of a media work. The user may request media works that contain a particular keyword and a classification ("scary" as a mood classification). In accordance with at least one embodiment, the service may provide a set of media works to the user in response to input from the user where the input can contain multiple parameters described above.

Figure 2:
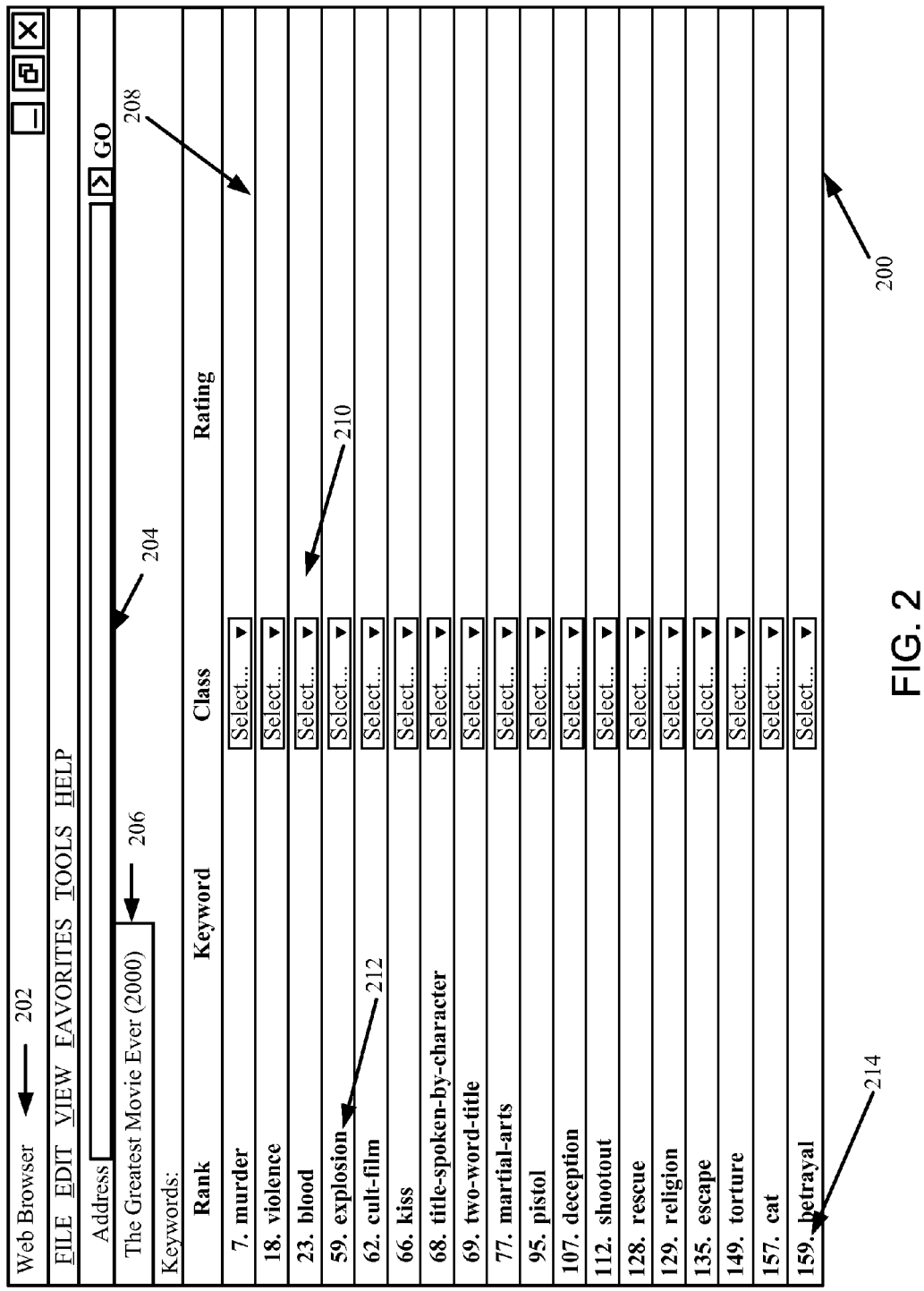
FIG. 2 illustrates an example user interface presented via a web browser for providing a keyword classification and ranking feature as described herein, according to at least one example.

FIG. 2 illustrates an example user interface presented via a web browser for providing a keyword classification and ranking feature as described herein, according to at least one example. In accordance with at least one embodiment, the network document 200 is presented using a web browser 202. The network document 200 illustrated in FIG. 2 includes an address bar 204, where a user may enter a Uniform Resource Locator (URL) to view a network document including information about a media work. Further, the network document 200 includes a media work title description 206, and a user interface 208 that can be interacted with by a user to provide classification information 210 for a keyword 212. The user interface 208 also presents the current rank 214 for a keyword 212 to the user.

In accordance with at least one embodiment, the user may provide classification information 210 for as many keywords 212 as the user desires via the user interface 208. In accordance with at least one embodiment, the user interface 208 may be presented to the user for interaction via a standalone application configured to run from a computing device. As described in FIGS. 3 and 4 below, the user may be prompted to provide rating information for a keyword 212 after classification information has been provided. It should be noted that although a plurality of keywords 212 are shown in FIG. 2, a media work may have more or less keywords associated with it. In accordance with at least one embodiment, the user may provide classification information 210 via methods other than the drop down option depicted in FIG. 2, such as selection from a list or radio buttons provided by the user interface 208.

Figure 3:
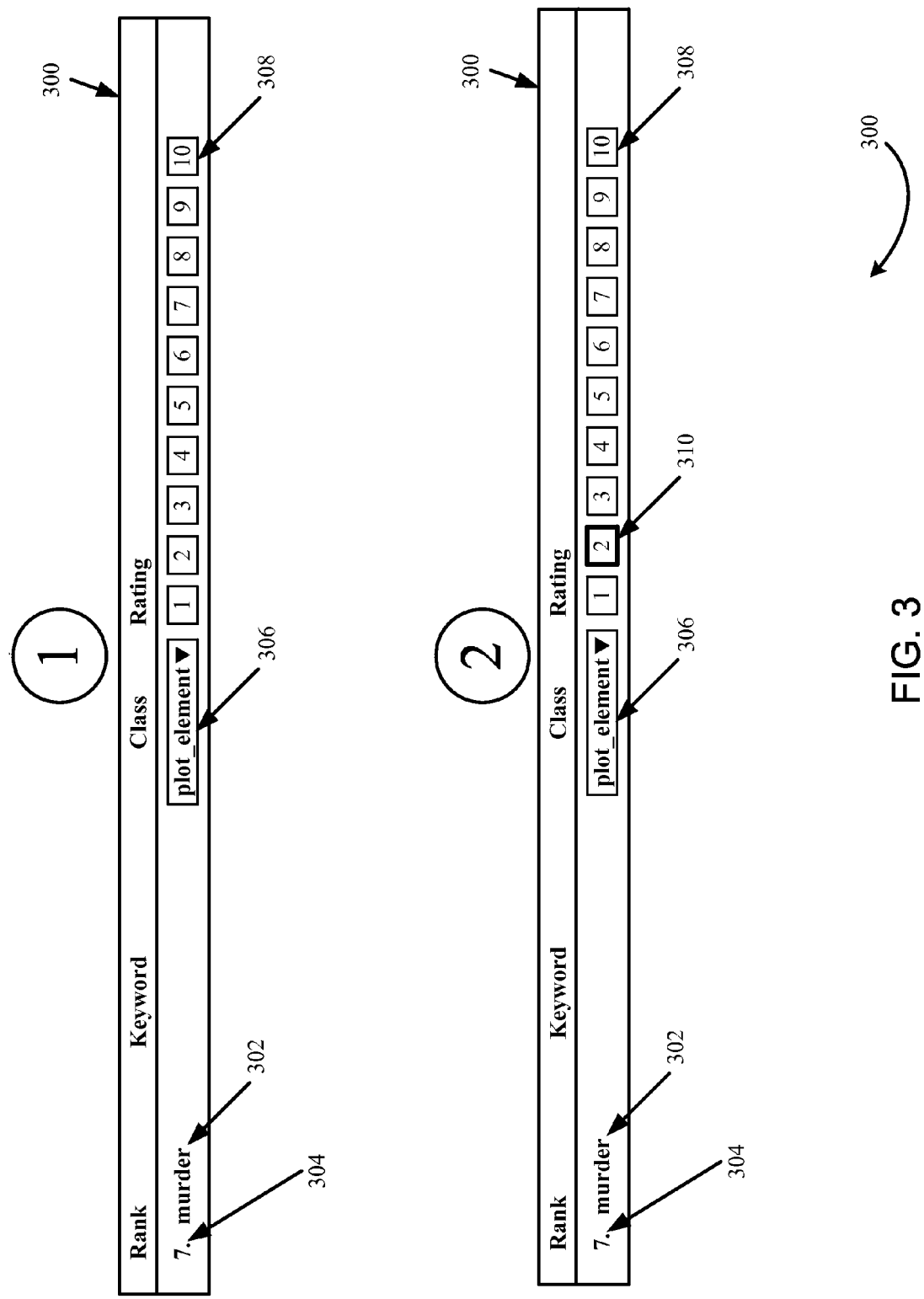
FIG. 3 illustrates aspects of an example user interface for providing a keyword classification and ranking feature as described herein, according to at least one example.

FIG. 3 illustrates aspects of an example user interface for providing a keyword classification and ranking feature as described herein, according to at least one example. FIG. 3 includes a portion of the user interface 208 presented in FIG. 2, reflecting the sequence of steps included for providing rating information after classification information 210 has been provided for a keyword. In step 1 of FIG. 3, the user interface 300, which represents a portion of user interface 208 of FIG. 2, includes a keyword 302, a rank 304, classification information 306, and a presentation of rating information 308. In the current example, the keyword 302 is murder, which has a current rank 304 of seven, with a user provided classification 306 of plot element, and the presentation of rating information 308 includes a selection from 1 to 10, with 1 indicating a low relevancy of the keyword and classification to the current media work and 10 indicating a high relevancy of the keyword and classification to the current media work. Step 2 of FIG. 3 represents a user indicating that the relevancy of the keyword and classification to the media work is low based on a selection of a rating of two 310. In accordance with at least one embodiment, the user may provide rating information 308 via methods other than the button selection option depicted in FIG. 3, such as selection from drop down menu or radio buttons provided by the user interface 300.

FIG. 4 illustrates an example user interface presented via a web browser for providing a keyword classification and ranking feature as described herein, according to at least one example. FIG. 4 illustrates a presentation via web browser of updated ranking for the keywords presented in FIG. 3 based on rating information provided by a hypothetical user in accordance with at least one embodiment. In accordance with at least one embodiment, the network document 400 is presented using a web browser 402. The network document 400 illustrated in FIG. 4 includes an address bar 404, where a user may enter a URL to view a network document including information about a media work. Further, the network document 400 includes a media work title description 406, and a user interface 408 that can be interacted with by a user to provide classification information 410 for a keyword 412. The user interface 408 also presents the updated rank 414 for a keyword 212 and rating information 416 for each keyword including the current rating for each keyword 418. In accordance with at least one embodiment, the user may provide classification information 410 and rating information 416 for as many keywords 412 as the user desires via the user interface 408. FIG. 4 illustrates that based on the user data provided in FIG. 3, the keyword murder 420 has an updated rank towards the bottom of available keywords associated with the media work 406 based at least in part on its rating information 418 of two out of ten.

In accordance with at least one embodiment, keywords associated with a media work may have their ranking updated based on aggregated data from a plurality of users providing classification information and rating information as illustrated in FIGS. 2-4. In the current example, FIG. 4 represents the ranking information 414, classification information 410 and rating information 416 aggregated from a plurality of users who interacted with a user interface to provide the service with information concerning the particular media work. As described above, the rank information, classification information, and rating information can be constantly updated based on users providing information to the service. In accordance with at least one embodiment, keywords that lack information, such as keyword 422 can be ranked lower than keywords that have associated classification and rating information, even if the rating information indicates low relevancy as rating information 418 indicates for keyword 420. In accordance with at least one embodiment, the service may slowly phase out keywords that consistently lack classification and rating information thus creating a set of keywords that are relevant to some degree to the media work. The generation of a keyword set for a media work that includes classification, rating information, and ranking information can aid the service in providing appropriate recommendations and search result sets to a user based on user queries.

Figure 5:
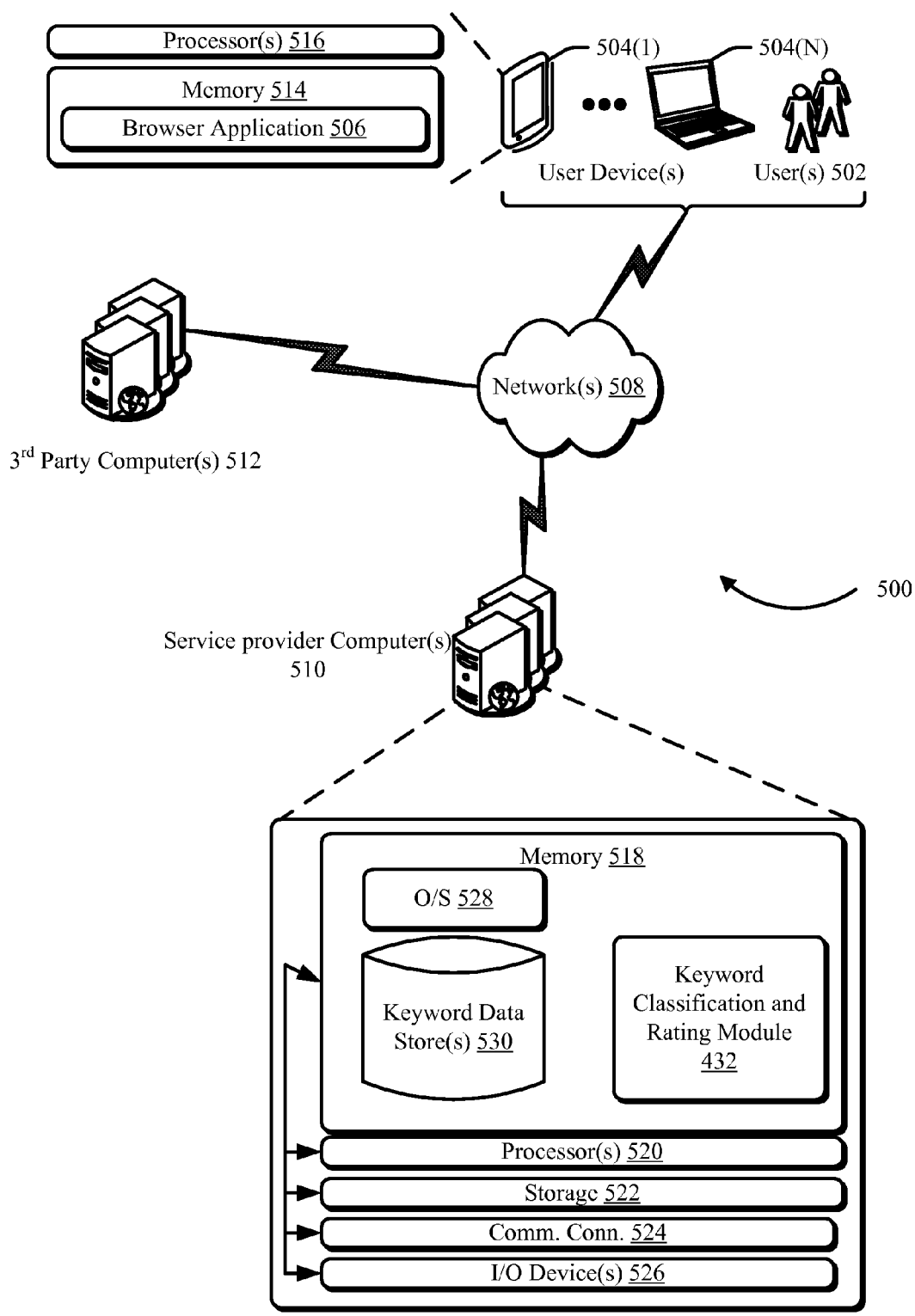
FIG. 5 illustrates an example architecture for a keyword classification and ranking feature described herein that includes one or more service provider computers and/or a user device connected via one or more networks, according to at least one example.

FIG. 5 illustrates an example architecture for a keyword classification and ranking feature described herein that includes one or more service provider computers and/or a user device connected via one or more networks, according to at least one example. In architecture 500, one or more users 502 (i.e., keyword classification and ranking service users) may utilize user computing devices 504(1)-(N) (collectively, user devices 504) to access an application 506 (e.g., a web browser), via one or more networks 508. In some aspects, the application 506 may be hosted, managed, and/or provided by a computing resources service or service provider, such as by utilizing one or more service provider computers and/or one or more keyword classification and ranking service computers 510. The one or more service provider computers 510 may provide a native application which is configured to run on the user devices 504 which the user 502 may interact with to provide keyword classification and rating information, request media work recommendations, and be presented with a set of media works in response to a recommendation or search request. The one or more service provider computers 510 may, in some examples, provide computing resources such as, but not limited to, client entities, low latency data storage, durable data storage, data access, management, virtualization, cloud-based software solutions, electronic content performance management, etc. The one or more service provider computers 510 may also be operable to provide web hosting, computer application development, and/or implementation platforms, combinations of the foregoing, or the like to the one or more users 502. The one or more service provider computers 510, in some examples, may communicate with one or more third party computers 512 to obtain classification and rating information for keywords associated with a media work. In some examples, the one or more service provider computers 510 may communicate with one or more third party computers 512 to provide services associated with a keyword classification and rating feature as described herein.

In some examples, the networks 508 may include any one or a combination of many different types of networks, such as cable networks, the Internet, wireless networks, cellular networks and other private and/or public networks. While the illustrated example represents the users 502 accessing the application 506 over the networks 508, the described techniques may equally apply in instances where the users 502 interact with the one or more service provider computers 510 via the one or more user devices 504 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 506 may allow the users 502 to interact with a service provider computer, such as to access web content (e.g., web pages, music, video, etc.). The one or more service provider computers 510, perhaps arranged in a cluster of servers or as a server farm, may host the application 506 and/or cloud-based software services. Other server architectures may also be used to host the application 506. The application 506 may be capable of handling requests from many users 502 and serving, in response, various item web pages. The application 506 can provide any type of website that supports user interaction, including social networking sites, online retailers, informational sites, blog sites, search engine sites, news and entertainment sites, and so forth. As discussed above, the described techniques can similarly be implemented outside of the application 506, such as with other applications running on the user devices 504.

The user devices 504 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 504 may be in communication with the one or more service provider computers 510 via the networks 508, or via other network connections. Additionally, the user devices 504 may be part of the distributed system managed by, controlled by, or otherwise part of the one or more service provider computers 510 (e.g., a console device integrated with the one or more service provider computers 510).

In one illustrative configuration, the user devices 504 may include at least one memory 514 and one or more processing units (or processor(s)) 516. The processor(s) 516 may be implemented as appropriate in hardware, computer-executable instructions, firmware, or combinations thereof. Computer-executable instruction or firmware implementations of the processor(s) 516 may include computer-executable or machine-executable instructions written in any suitable programming language to perform the various functions described. The user devices 504 may also include geo-location devices (e.g., a global positioning system (GPS) device or the like) for providing and/or recording geographic location information associated with the user devices 504.

The memory 514 may store program instructions that are loadable and executable on the processor(s) 516, as well as data generated during the execution of these programs. Depending on the configuration and type of user device 504, the memory 514 may be volatile (such as random access memory (RAM)) and/or non-volatile (such as read-only memory (ROM), flash memory, etc.). The user device 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM.

Turning to the contents of the memory 514 in more detail, the memory 514 may include an operating system and one or more application programs or services for implementing the features disclosed herein including at least a user provided input element or electronic service web page, such as via the browser application 506 or dedicated applications (e.g., smart phone applications, tablet applications, etc.). The browser application 506 may be configured to receive, store, and/or display a website or other interface for interacting with the one or more service provider computers 510. Additionally, the memory 514 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 502 provided response to a security question or a geographic location obtained by the user device 504.

In some aspects, the one or more service provider computers 510 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 510 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the one or more service provider computers 510 may be in communication with the user devices 504 and/or other service providers via the networks 508, or via other network connections. The one or more service provider computers 510 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, the one or more service provider computers 510 may include at least one memory 518 and one or more processing units (or processor(s)) 520. The processor(s) 520 may be implemented as appropriate in hardware, computer-executable instructions, firmware, or combinations thereof. Computer-executable instruction or firmware implementations of the processor(s) 520 may include computer-executable or machine-executable instructions written in any suitable programming language to perform the various functions described.

The memory 518 may store program instructions that are loadable and executable on the processor(s) 520, as well as data generated during the execution of these programs. Depending on the configuration and type of the one or more service provider computers 510, the memory 518 may be volatile (such as RAM) and/or non-volatile (such as ROM, flash memory, etc.). The one or more service provider computers 510 or servers may also include additional storage 522, which may include removable storage and/or non-removable storage. The additional storage 522 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 518 may include multiple different types of memory, such as SRAM, DRAM, or ROM.

The memory 518, the additional storage 522, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 518 and the additional storage 522 are all examples of computer storage media. Additional types of computer storage media that may be present in the one or more service provider computers 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 510 may also contain communications connection(s) 524 that allow the one or more service provider computers 510 to communicate with a stored database, another computing device or server, user terminals and/or other devices on the networks 508. The one or more service provider computers 510 may also include I/O device(s) 526, such as a keyboard, a mouse, a pen, a voice input device, a touch input device, a display, speakers, a printer, etc.

Turning to the contents of the memory 518 in more detail and as will be described in further detail with reference to FIG. 6, the memory 518 may include an operating system 528, one or more data stores 530, and/or one or more application programs or services for implementing the features disclosed herein including a keyword classification and rating module 532. In accordance with at least one embodiment, the keyword classification and rating module 532 may be responsible for receiving classification and rating information for a plurality of keywords associated with a media work from a plurality of users, ranking the plurality of keywords for the media work, and in response to user input, providing a set of media works to the user based at least in part on ranking information for the set of media works.

Figure 6:
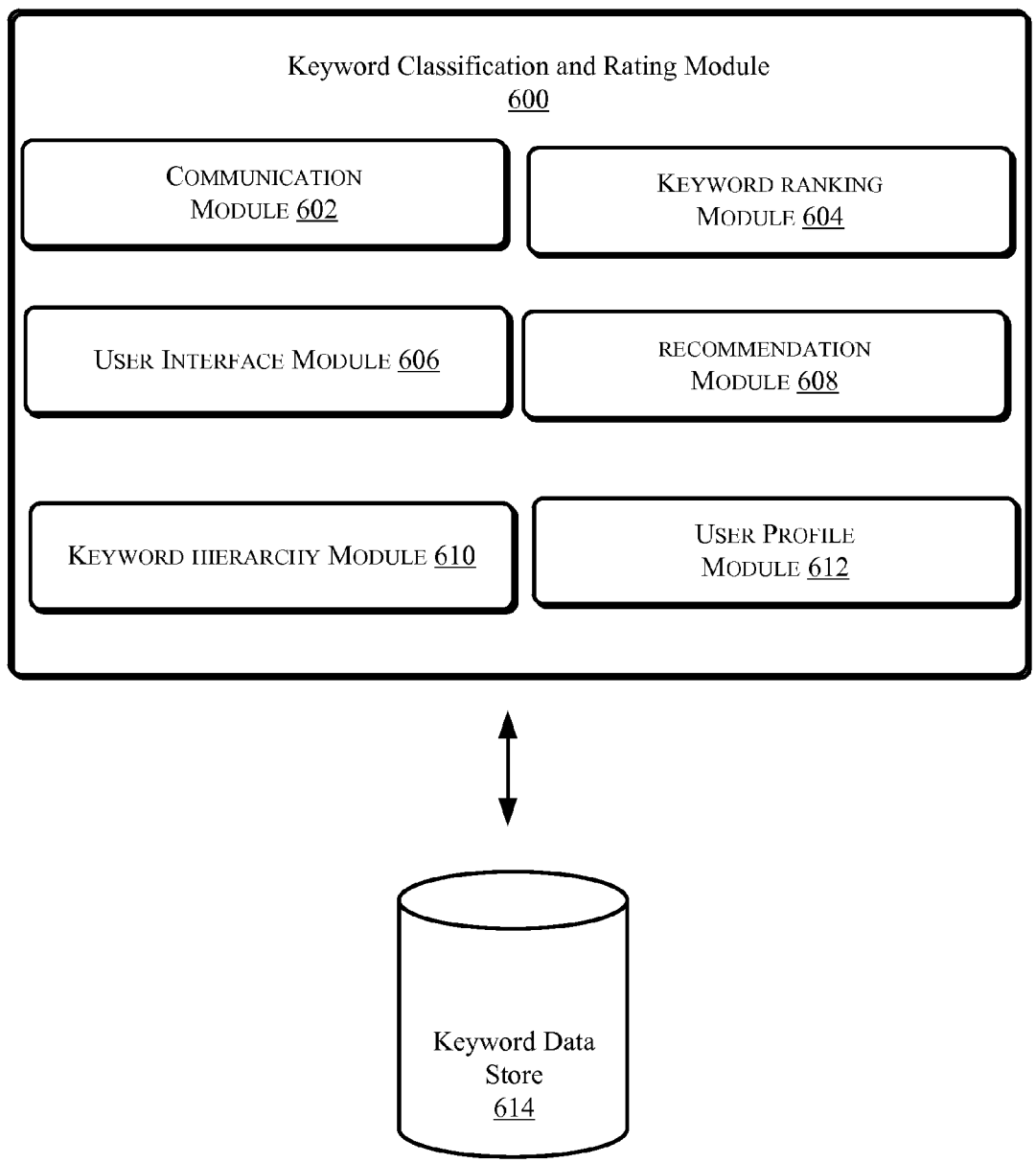
FIG. 6 illustrates a schematic diagram depicting aspects of an example keyword classification and rating module, according to at least one example.

FIG. 6 illustrates a schematic diagram depicting aspects of an example keyword classification and rating module, according to at least one example. The keyword classification and rating module 600 may be an example of keyword classification and rating module 532 from FIG. 5. The modules included within and including the keyword classification and rating module 600 may be software modules, hardware modules or a suitable combination thereof. If the modules are software modules, the modules can be embodied on a non-transitory computer readable medium and processed by a processor in any of the computer systems described herein. It should be noted that the described processes and architectures described below can be performed either in real-time or in an asynchronous mode prior to any user interaction. The modules may be configured in the manner suggested in FIG. 6 or may exist as separate modules.

In accordance with at least one embodiment, the keyword classification and rating module 600 may contain a communication module 602, a keyword ranking module 604, a user interface module 606, a recommendation module 608, a keyword hierarchy module 610, and a user profile module 612. In accordance with at least one embodiment, the modules 600-612 may be in communication with one or more data stores 614. In accordance with at least one embodiment, the keyword classification and rating module 600 may be configured to classify and rate keywords for a media work based on user input. The communication module 602 and user interface module 606 may be configured to present a user interface through which a user can provide classification and rating information for a media work. The keyword ranking module 604 may be configured to rank a plurality of keywords associated with a media work based on the classification and rating information. The recommendation module 608 may be configured to present a set of media works to a user, via a user interface, in response to receiving a search or recommendation query. In accordance with at least one embodiment, the recommendation module 608 may be configured to provide a set or list of relevant media works to the user in response to receiving a search or recommendation query. In accordance with at least one embodiment, the recommendation module 608 may provide or present a comparative list of media works for the user to further browse, consider for viewing, or provide classification and rating information. In accordance with at least one embodiment, the recommendation module 608 may provide a set of antonym keywords that are antonyms to the keyword (s) associated with a search or recommendation query. Further, the recommendation module 608 may provide a set of media works that include the antonym keywords instead of or in addition to a set of media works with similar keywords. The keyword hierarchy module 610 may be configured to maintain and update a hierarchical tree of keywords based on classification and rating information to aid in recommendation or search requests from users. The user profile module 612 may be configured to maintain a user profile for a user for use in weighing classification and rating information from particular users and to maintain peer ratings for users. In accordance with at least one embodiment, the keyword classification and rating module 600 may communicate with one or more third party computers to obtain classification and rating information via networks 508 from one or more third party computers 512 (FIG. 5).

In accordance with at least one embodiment, the keyword classification and rating module 600, the communication module 602, and the user interface module 606 may be responsible for providing a user interface to a user and receiving user input specifying classification and rating information for a media work. For example, the modules may be configured to present a user interface such as the user interface discussed above in FIG. 4. In accordance with at least one embodiment, the keyword classification and rating module 600, the communication module 602, and the user interface module 606 may be responsible for implementing an application configured to run on a user device to present a user interface that can receive user input regarding classification and rating information for a media work. In accordance with at least one embodiment, the keyword classification and rating module 600, the communication module 602, and the user interface module 606 may be configured to receive user input from a plurality of users. In accordance with at least one embodiment, the keyword classification and rating module 600 may be configured to aggregate the classification and rating information received from the plurality of users interacting with the service associated with an online information resource.

In accordance with at least one embodiment, the keyword classification and rating module 600 may be configured to assign a classification and a rating to a keyword based at least in part on the aggregated classification and rating information gathered from a plurality of users. For example, if the majority of users interacting with the service provide information indicating that the keyword murder for a particular media work should be classified as a plot element and that the rating should be a two out of ten, then the keyword murder for the particular media can be assigned the classification of plot element with a rating of two. In accordance with at least one embodiment, a keywords classification and rating may be updated and modified based on the aggregated classification and rating information obtained from a plurality of users. In accordance with at least one embodiment, the keyword classification and rating module 600 may store and maintain the keywords and their associated classification and rating information in the data store 614. In accordance with at least one embodiment, the keyword classification and rating module 600 may be responsible for maintaining and applying one or more policies associated with keywords and keyword classification and rating information.

In accordance with at least one embodiment, the keyword classification and rating module 600 may be store and maintain the policies in the data store 614. In accordance with at least one embodiment, one or more policies may be applied to newly entered keywords for a media work. The policies may ensure that the keyword contains correct syntax, to ensure that the keyword is in the English language, and to identify any profanities. In accordance with at least one embodiment, a policy may not allow newly entered keywords to be associated with a media work until a probation period has passed and the keyword has gone through some form of human review. The policy may require the keyword obtain a certain amount of classification and rating information within a time threshold or be removed permanently from the keyword list associated with a media work.

In accordance with at least one embodiment, the keyword ranking module 604 may be configured to rank one or more keywords associated with a media work based on the aggregated classification and rating information obtained from a plurality of users. In accordance with at least one embodiment, the keyword ranking module 604 may utilize an algorithm to rank particular keywords of the plurality of keywords higher than others based on their rating information. For example, a keyword that has a classification of tone and a rating of 4 may be ranked lower than a keyword that has a classification of theme and a rating of 8. In accordance with at least one embodiment, different keywords that are classified with similar classification designations may be ranked based on their rating with the keyword that contains more aggregate date identifying it as a higher rating placing it higher in the ranking.

In accordance with at least one embodiment, the keyword ranking module 604 may identify that certain keywords associated with a media work require more rating and classification information to properly rank the plurality of keywords. The keyword ranking module 604, communication module 602, user interface module 606, and the user profile module 612 may be configured to send requests, to a user's email as an example, for more information to users of the service or associated with the online information resource. In accordance with at least one embodiment, the user interface module 606, the keyword ranking module 604, and the communication module 602 may illicit users of the service for classification and rating information for a particular media work as the user is interacting with the online information resource associated with the service. In accordance with at least one embodiment, the user interface module 606, the keyword ranking module 604, and the communication module 602 may be configured to request and receive user input regarding classification and rating information from a third party. In accordance with at least one embodiment, the service may identify that a particular media work requires more information in order to properly rank the associated keywords. The service may request information from a social networking site associated with users of the service. For example, the service may request permission to post informational requests or questionnaires on a user's social networking site. The information request may be interacted with not only by the user themselves but any other social network connections the user maintains. In accordance with at least one embodiment, the service may utilize the classification and rating information received from a third party to rank the plurality of keywords associated with a media work.

In accordance with at least one embodiment, the recommendation module 608, the communication module 602, and the user interface module 606 may be configured to provide a set of media works to a user, via a user interface, in response to a recommendation or search request from the user. For example, a user may interact with the user interface provided by the service to request a movie similar to Pirate Blockbuster (2000). In response, the service may utilize the ranking information of the media work provided and the ranking information of the plurality of media works associated with the service to recommend a set of movies to the user for viewing. In accordance with at least one embodiment, the service may provide a set of media works to the user in response to a recommendation request that contains more parameters than just a media work title. The recommendation module 608 may utilize the ranking information maintained by the keyword ranking module 604 to provide a set of media works to the user that satisfy multiple parameter queries. For example, a user may specify that they wish to be provided with recommended media works that contain a particular keyword, a particular classification, and a particular rating. The user may indicate that they wish to see recommendations for media works that contain the keyword murder as content with a high relevancy rating. In accordance with at least one embodiment, the recommendation module 608 may interact with the keyword ranking module 604 and the keyword classification and rating module 600 to provide a set of media works that satisfies the multiple parameter query request from a user.

In accordance with at least one embodiment, the recommendation module 608 may be configured to request feedback information from a user based on the result set of media works presented to the user based on a search or recommendation request. For example, the user may be able to provide information indicating that the set of media works presented to them based on their request is incorrect, or contains dissimilarities based on the parameters of the request. Also, the user can provide positive feedback indicating that the result set of media works presented to them contained similar titles that aligned correctly with the parameters of their request. In accordance with at least one embodiment, the recommendation module 608, the communication module 602, the keyword classification and rating module 600, and the user interface module 606 may be configured to request classification and rating information for a particular media work based on negative feedback provided by a user. The service may utilize the aggregated classification and rating information to either apply new classifications for keywords, update the rating for the keywords, or update the ranking of the keywords for the media work to avoid further negative feedback from the users.

In accordance with at least one embodiment, the keyword hierarchy module 610 may be configured to generate and maintain a hierarchical tree structure for the keyword classifications. In accordance with at least one embodiment, the keyword hierarchy module 610 may update the hierarchical structure based on updated rating and classification information provided by users of the service. In accordance with at least one embodiment, the keyword hierarchy module 610 and the recommendation module 608 may be utilized to efficiently provide result sets of a plurality of media works based on search or recommendation requests from a user. For example, if a user requests media works that contain the keyword horror as a mood classification, the keyword hierarchy module 610 and recommendation module 608 may quickly identify all media works that contain the keyword horror as a mood classification by navigating through the hierarchical tree structure to the node that contains all keywords classified as mood. In accordance with at least one embodiment, the user profile module 612 and the keyword classification and rating module 600 may maintain user profiles associated with users of the keyword classification and rating service.

The user profile module 612 and the user interface module 606 may be configured to allow users to rate other users based on their keyword additions to a media work, or their classifications and ratings. In accordance with at least one embodiment, the keyword classification and rating module 600 may be configured to utilize a user's peer rating to weigh that particular users input differently than other users. For example, if a user has a high peer rating, than the service may weigh the classification and rating information that they provide for a keyword more heavily than other users. In accordance with at least one embodiment, the keyword ranking module 604 may update the ranking of a set of keywords associated with a movie based on the weighted input of a plurality of users. In accordance with at least one embodiment, the service may rate the users associated with the service based on the accuracy of information provided by the user concerning a media work. For example, the service may request information about a newly added media work from users associated with the service. Based on a particular users input, the service may identify that a user has entered accurate information and in response raise the user's rating.

Figure 7:
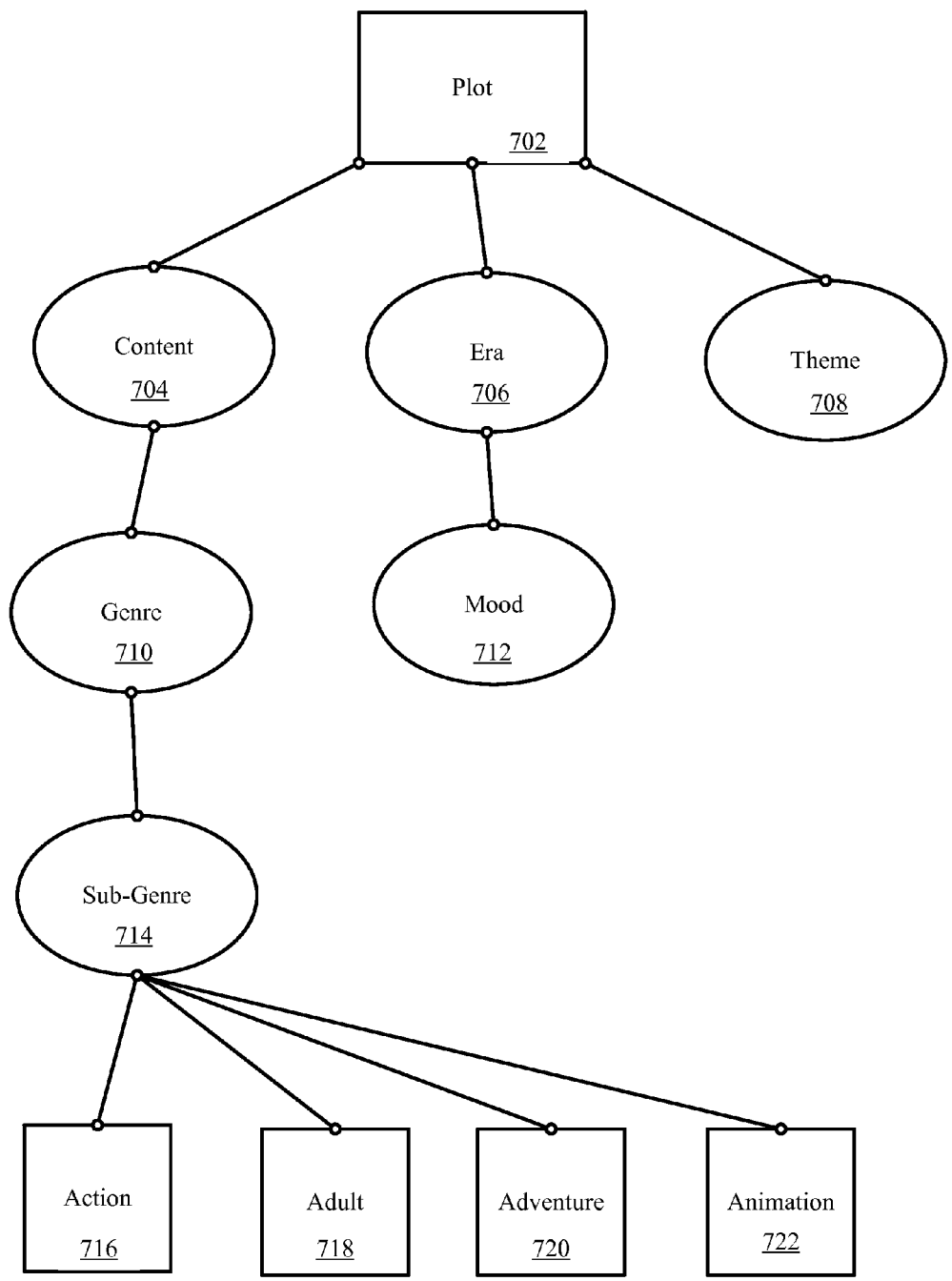
FIG. 7 illustrates an example classification hierarchy tree for a keyword classification and ranking feature as described herein, according to at least one example.

FIG. 7 illustrates an example classification hierarchy tree for a keyword classification and ranking feature as described herein, according to at least one example. In some embodiments, the keyword classification hierarchy 700 represents the plurality of keyword classifications maintained by the service. The keyword classification hierarchy 700 may be partitioned into a plurality of classifications specified by the service. In the current example, the keyword classification hierarchy 700 includes a root node of the plot classification 702, and several leaf nodes from the root node including a node for a content classification 704, an era classification 706, a theme classification 708, a genre classification 710, and a mood classification 712. In accordance with at least one embodiment, the service may also identify and maintain sub-classifications as illustrated with a node for the sub-genre classification 714 which may contain several nodes representing an action classification 716, an adult classification 718, an adventure classification 720, and an animation classification 722. In accordance with at least one embodiment and as described above, the keyword hierarchy module 610 may update the hierarchy structure based on information obtained by the keyword classification and rating module 600 and the keyword ranking module 604. As described above, the levels of the keyword classification hierarchy 700 may be based at least in part on the number of keywords that are assigned the classification with the root node designated as the keyword classification containing the highest number of keyword associations. It should be noted that while a hierarchical tree structure is discussed in the current example, the service may utilize any appropriate search and retrieve data models for efficient information storage.

Figure 8:
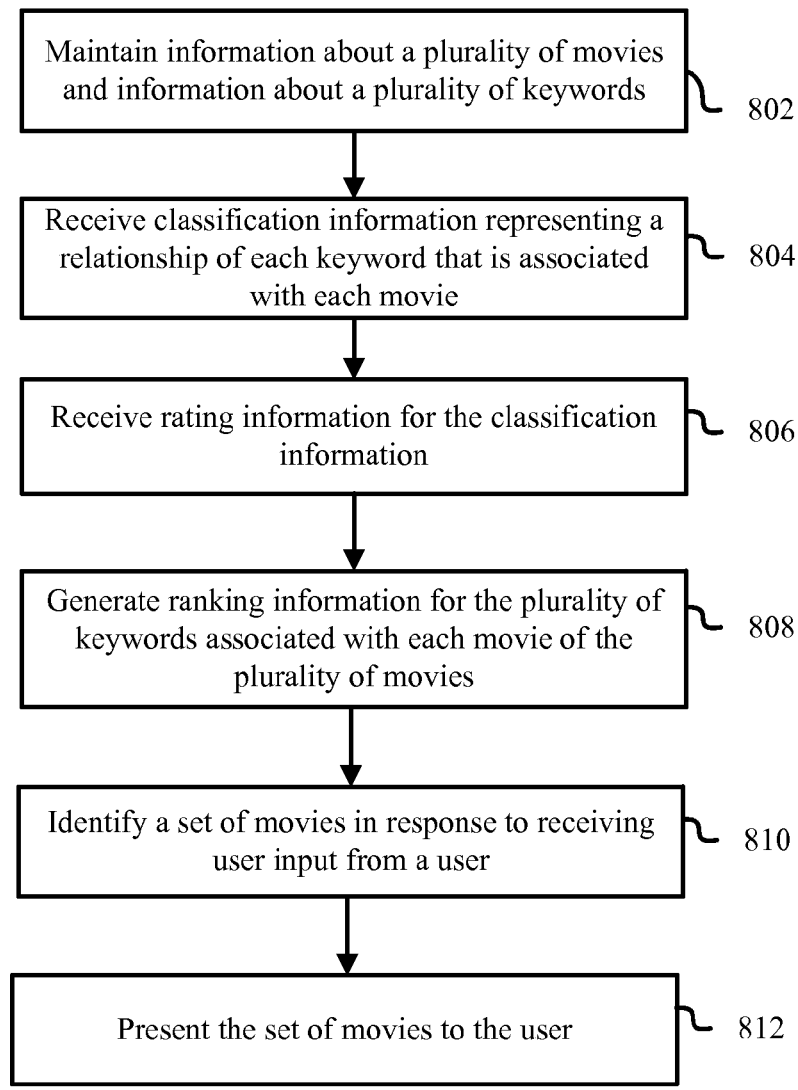
FIG. 8 illustrates an example flow diagram of a process for describing an implementation of a keyword classification and rating feature described herein, according to at least one example.
Figure 9:
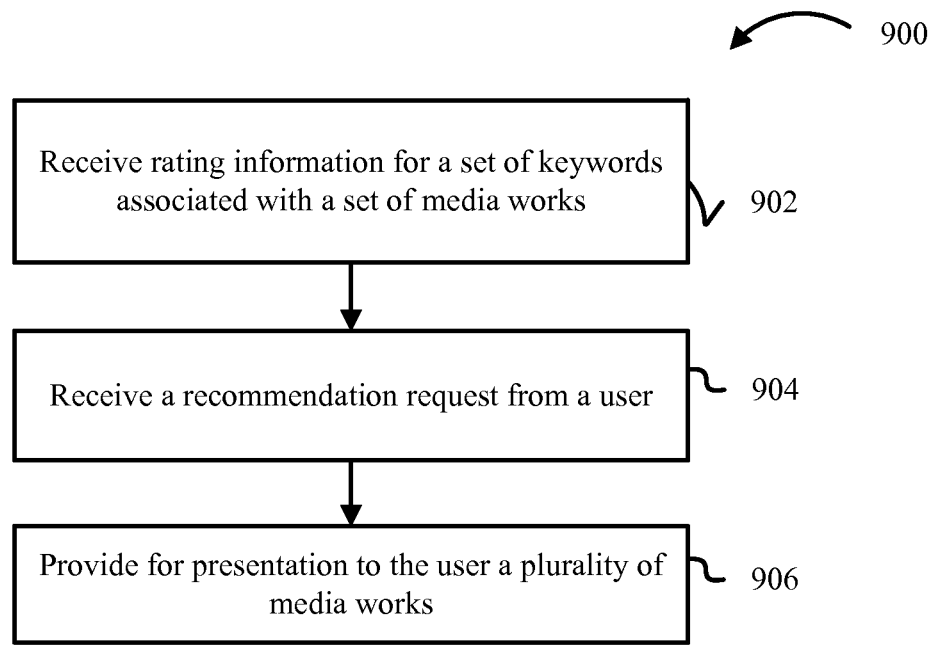
FIG. 9 illustrates an example flow diagram of a process for describing an implementation of a keyword classification and rating feature described herein, according to at least one example.
Figure 10:
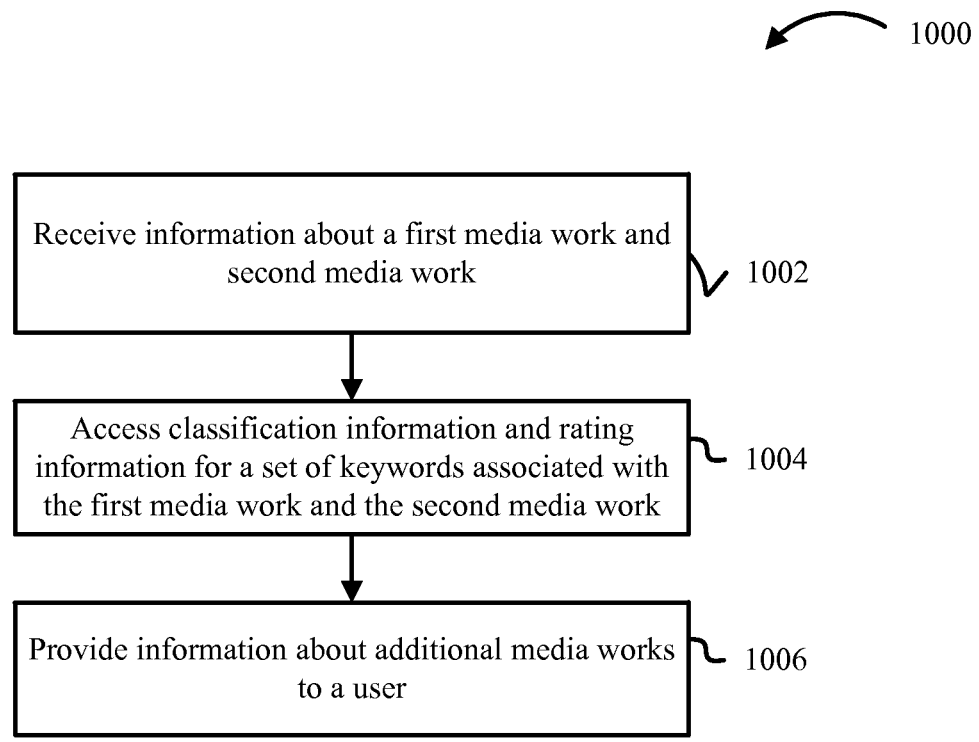
FIG. 10 illustrates an example flow diagram of a process for describing an implementation of a keyword classification and rating feature described herein, according to at least one example.

FIGS. 8-10 illustrate example flow diagrams showing respective processes 800, 900, and 1000 for an implementation of a keyword classification and rating feature described herein, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 8 illustrates an example flow diagram of a process for describing an implementation of a keyword classification and rating feature described herein, according to at least one example. In some examples, the one or more service provider computers 510 (e.g., utilizing at least one of the keyword classification and rating module 600, the communication module 602, the keyword ranking module 604, the user interface module 606, the recommendation module 608, the keyword hierarchy module 610, the user profile module 612, and the one or more data stores 614) shown in FIG. 6 may perform the process 800 of FIG. 8. The process 800 may begin at 802 by maintaining information about a plurality of movies and information about a plurality of keywords. In an embodiment, each of the plurality of movies may have one or more of the plurality of keywords associated with it. At 804, the process 800 may include receiving classification information representing a relationship of each keyword that is associated with each movie. In an embodiment, the classification information may be received from a plurality of users. At 806, the process 800 may include receiving rating information for the classification information. In accordance with at least one embodiment, the rating information for each keyword associated with a movie can represent a relevancy of the classification information and/or the keyword with the movie. At 808, the process 800 can include generating ranking information for the plurality of keywords associated with each movie of the plurality of movies. In an embodiment, the service may generate the ranking information for the plurality of keywords associated with the media work based at least in part on the classification information and the rating information. At 810, the process 800 can include identifying a set of movies in response to receiving user input from a user. In an embodiment, the user input can include a search keyword, such as murder, and the set of movies may be identified based at least in part on the search keyword and the ranking information. The process 800 may conclude at 812 by providing the set of movies to the user. In an embodiment, the set of movies may be provided to the user via a user interface presented by the service.

FIG. 9 illustrates an example flow diagram of a process for describing an implementation of a keyword classification and rating feature described herein, according to at least one example. In some examples, the one or more service provider computers 510 (e.g., utilizing at least one of the keyword classification and rating module 600, the communication module 602, the keyword ranking module 604, the user interface module 606, the recommendation module 608, the keyword hierarchy module 610, the user profile module 612, and the one or more data stores 614) shown in FIG. 6 may perform the process 900 of FIG. 9. The process 900 may begin at 902 by receiving rating information for a set of keywords associated with a set of media works. In an embodiment, the rating information can represent a relevancy of a keyword with a media work of the set of media works. At 904, the process 900 may include receiving a recommendation request from a user. In an embodiment, the recommendation request can include information about an associated keyword of a particular media work. For example, a user may request a recommendation for movies similar to Pirate Blockbuster (information about a particular media work) that has heavy supernatural plot elements (relevance of a classification of a keyword associated with a media work). The process 900 may conclude at 906 by providing for presentation to the user a plurality of media works. In an embodiment, the plurality of media works may be based at least in part on the rating information for the set of keywords for each media work of the set of media works and the recommendation request.

FIG. 10 illustrates an example flow diagram of a process for describing an implementation of a keyword classification and rating feature described herein, according to at least one example. In some examples, the one or more service provider computers 510 (e.g., utilizing at least one of the keyword classification and rating module 600, the communication module 602, the keyword ranking module 604, the user interface module 606, the recommendation module 608, the keyword hierarchy module 610, the user profile module 612, and the one or more data stores 614) shown in FIG. 6 may perform the process 1000 of FIG. 10. The process 1000 may begin at 1002 by receiving information about a first media work and a second media work. In an embodiment, the information can include a title description for the media work, or keywords associated with the first media work and second media work. At 1004 the process 1000 can include accessing classification information and rating information for a set of keywords associated with the first media work and the second media work. In an embodiment, the service may have previously obtained or received the classification and rating information about the first and second media work from a plurality of users. The process 1000 can conclude at 1006 by providing information about additional media works to a user. In accordance with at least one embodiment, the service may provide for presentation the plurality of media works based at least in part on an algorithm utilizing the classification information and the rating information for the first media work and the second media work. In accordance with at least one embodiment, the service may utilize a weighted data join algorithm.

Figure 11:
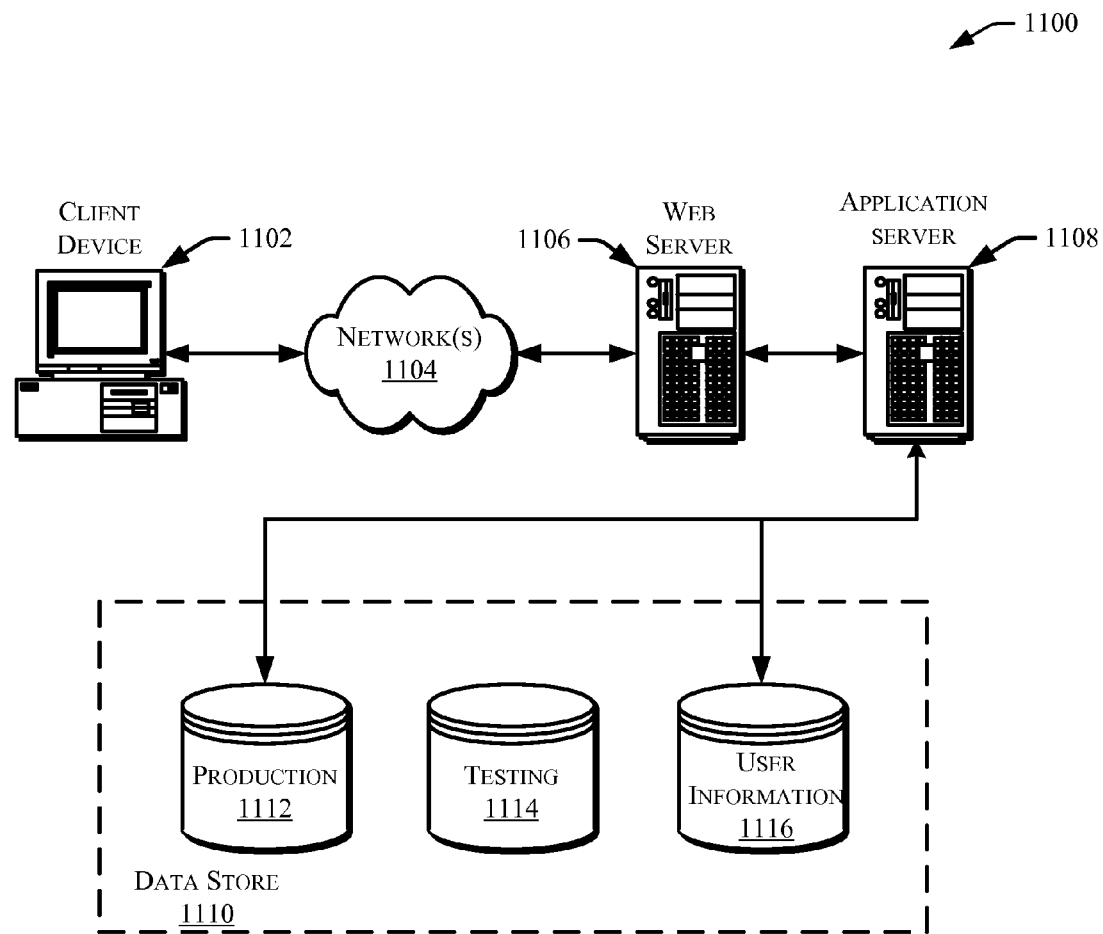
FIG. 11 illustrates an environment in which various embodiments of a keyword classification and ranking feature described herein can be implemented, according to at least one example.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
    maintaining, at a computer system, information about a plurality of movies and information about a plurality of keywords, each of the plurality of movies having one or more of the plurality of keywords associated therewith;
    receiving from a plurality of users, by a computing system, classification information including one or more terms, the classification information representing a relationship of each keyword and term pair to each movie;
    receiving rating information for the classification information from the plurality of users, the rating information, for each keyword associated with a movie, representing a relevancy of the classification information and the keyword with the movie;
    generating, by the computing system, ranking information for the plurality of keywords associated with each movie of the plurality based at least in part on the classification information and the rating information;
    in response to receiving user input from a user, the user input including a search keyword:
        identifying a set of movies based at least in part on the search keyword and the ranking information; and
        presenting the set of movies to the user.

2. The computer-implemented method of claim 1, further comprising receiving from a third party the classification information and the rating information.

3. The computer-implemented method of claim 2, wherein the third party includes at least a social networking website.

4. The computer-implemented method of claim 1, further comprising:
    maintaining a user profile for each user of the plurality of users; and
    weighing input about the classification information and the rating information provided by said user of the plurality of users based at least in part on user profile information.

5. The computer-implemented method of claim 4, wherein the user profile information includes at least peer ratings, the peer ratings provided by the plurality of users.

6. The computer-implemented method of claim 4, wherein the user profile information includes a service rating, the service rating provided by the online information resource associated with the plurality of movies.

7. A computer-implemented method comprising:
    in response to receiving, at a computer system, information about a keyword associated with a media work, identifying, by the computer system, a set of media works based at least in part on:
    aggregated classification information for a plurality of keywords associated with a plurality of media works, the aggregated classification information including one or more terms and representing a relationship of each keyword and term pair to each media work of the plurality of media works, the aggregated classification information determined based at least in part on first input from a plurality of users;
    aggregated rating information for the aggregated classification information, the aggregated rating information of said each keyword representing a relevancy of a particular keyword classification and at least one media work of the plurality of media works, the aggregated rating information determined based at least in part on second input from the plurality of users; and
    generating, by the computer system, ranking information for the plurality of keywords associated with each media work of the plurality of media works based at least in part on the aggregated classification information and the aggregated rating information.

8. The computer-implemented method of claim 7, wherein identifying the set of media works includes at least recommending the set of media works, providing a comparative list of media works, or providing a set of antonym keywords, wherein the antonym keywords are antonyms to associated keywords of the set of media works.

9. The computer-implemented method of claim 7, wherein identifying the set of media works is further based at least in part on the ranking information.

10. The computer-implemented method of claim 7, wherein a media work includes at least one of a movie, a TV show, a web series, a video game, a commercial, a music video, or a work of literature.

11. The computer-implemented method of claim 7, wherein the information about the keyword associated with the media work includes at least a title of the media work, a classification of the keyword associated with the media work, a rating of a keyword classification, or a unique identifier associated with the media work.

12. A system, comprising:
    a processor; and
    memory including computer-executable instructions that, when executed by the processor, cause the system to at least:
        receive, from a plurality of users, classification information including one or more terms, the classification information representing a relationship of a keyword, of a plurality of keywords, and term pair to a media work;

receive, from the plurality of users, rating information for a set of keywords associated with a set of media works, the rating information for each keyword associated with each media work representing a relevancy of a keyword and associated classification information with said media work;

receive a recommendation request from a user, the recommendation request including information about an associated keyword of a particular media work; and provide for presentation to the user a plurality of media works based at least in part on the rating information and the classification information for the set of keywords for said each media work of the set of media works and the recommendation request.

13. The system of claim 12, wherein the computer-executable instructions further cause the system to at least generate rank information for said each keyword associated with said each media work based at least in part on the classification information and the rating information for said each media work.

14. The system of claim 12, wherein the computer-executable instructions further cause the system to at least:
request user feedback from the user based at least in part on the plurality of media works; and
request the rating information for the plurality of media works from the user based at least in part on the user feedback.

15. The system of claim 12, wherein the computer-executable instructions further cause the system to at least generate and maintain a hierarchical tree object for the classification information.

16. The system of claim 12, wherein the computer-executable instructions further cause the system to at least maintain a set of policies for the set of keywords.

17. The system of claim 12, wherein the computer-executable instructions further cause the system to at least receive input about a new keyword associated with a media work, the input including an alpha-numeric string for the new keyword.

18. The system of claim 17, wherein the computer-executable instructions further cause the system to at least prevent the new keyword from associating with the media work until a threshold period of time has expired.

19. A non-transitory computer-readable storage medium collectively storing computer-executable instructions that, when executed by a computer system, configure the computer system to collectively perform operations comprising:

receiving information about a first media work and a second media work;

accessing classification information and rating information for a set of keywords associated with the first media work and the second media work, the classification information including one or more terms, the classification information representing a relationship of each keyword, of the set of keywords, and a term pair that is associated with the first and second media works, the rating information representing a relevancy of the classification information and said each keyword with the first and second media works;

providing information about additional media works to a user based at least in part on an algorithm utilizing the classification information and the rating information for the first media work and the second media work; and generating rank information for the set of keywords associated with the first media work and the second media work based at least in part on the classification information and the rating information for the first media work and the second media work.

20. The non-transitory computer-readable storage medium of claim 19 wherein providing the information about the additional media works to the user includes the algorithm utilizing the rank information for the set of keywords associated with the first media work and the second media work.

21. The non-transitory computer-readable storage medium of claim 19, further comprising requesting the classification information and the rating information from a plurality of users for the first media work and the second media work based at least in part on a threshold number of the set of keywords without the classification information and the rating information.

22. The non-transitory computer-readable storage medium of claim 21, wherein requesting the classification information and the rating information from the plurality of users for the first media work and the second media work includes presenting a questionnaire on a social network site associated with the plurality of users.

* * * * *